United States Patent
DeWeert

(10) Patent No.: US 11,069,035 B2
(45) Date of Patent: Jul. 20, 2021

(54) METHOD FOR DOUBLE-EXPOSURE IMAGE PROCESSING

(71) Applicant: BAE Systems Information and Electronic Systems Integration Inc., Nashua, NH (US)

(72) Inventor: Michael J. DeWeert, Kaneohe, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 76 days.

(21) Appl. No.: 16/717,107

(22) Filed: Dec. 17, 2019

(65) Prior Publication Data

US 2021/0183017 A1    Jun. 17, 2021

(51) Int. Cl.
| | |
|---|---|
| *G06K 9/00* | (2006.01) |
| *G06T 5/00* | (2006.01) |
| *G06T 5/50* | (2006.01) |
| *G06T 7/73* | (2017.01) |

(52) U.S. Cl.
CPC .............. *G06T 5/002* (2013.01); *G06T 5/50* (2013.01); *G06T 7/75* (2017.01); *G06T 2207/20182* (2013.01); *G06T 2207/20224* (2013.01)

(58) Field of Classification Search
CPC .. G06T 5/002; G06T 7/75; G06T 2207/20182
USPC .................................................. 382/254–275
See application file for complete search history.

(56) References Cited

U.S. PATENT DOCUMENTS

| | | | |
|---|---|---|---|
| 2013/0176445 A1* | 7/2013 | Streeter .............. | H04N 5/23254 348/208.1 |
| 2015/0139560 A1* | 5/2015 | DeWeert ................ | H04N 19/42 382/233 |

OTHER PUBLICATIONS

Hansen, Per Christian. "Deconvolution and regularization with Toeplitz matrices." Numerical Algorithms 29 (2002): 323-378. (Year: 2002).*

* cited by examiner

*Primary Examiner* — Andrew M Moyer
(74) *Attorney, Agent, or Firm* — Sand, Sebolt & Wernow LPA

(57) ABSTRACT

Systems and methods for double-exposure image processing utilizing inversion techniques are provided. The systems and methods of the present disclosure recover single-exposure images from double-exposure images and strain images from double-exposure images.

20 Claims, 8 Drawing Sheets

METHOD FOR DOUBLE-EXPOSURE IMAGE PROCESSING

TECHNICAL FIELD

The present disclosure relates generally to systems and methods for image processing. More particularly, the present disclosure relates to systems and methods for double-exposure image processing. Specifically, the present disclosure relates to systems and methods for double-exposure image processing utilizing inversion techniques.

BACKGROUND

Background Information

Generally, a double-exposure image is a superimposition of two exposures to create a single image. In digital shearography systems, the raw sheared specklegrams typically present as simultaneous double-exposure images, with the exposures spatially separated by a shear vector. The shear vector allows light from points separated by the shear vector to interfere, encoding information about phase in the object being imaged. Changes in phase are revealed by analyzing a series of shearograms acquired as the surface experiences variable loads. From a series of specklegrams acquired under at least one varying loading condition (such as, for example, vibration, mechanical stress, temperature, etc.), a shearogram is constructed. The shearogram reveals microscopic optical-phase-shifting effects of the varying load that would not otherwise be evident. The gross reflectance features in the specklegrams cancel out in shearographic processing reducing sensitivity to the optical-phase shifts. As such, the gross reflectance features are usually of no interest and considered to be a nuisance that consumes dynamic range.

However, because of the double-exposure effect, shearographic imagers for remote sensing are commonly paired with conventional spotting imagers that provide single-exposure images, adding context for the shearographic analyst. One drawback associated with utilizing conventional spotting imagers is the additional size, weight, power and cost of the additional spotting imagers within the shearographic imaging system. Another drawback associated with utilizing conventional spotting imagers is additional processing required to co-register the spotting functions with the shearography systems. However, for double exposures constructed from unrelated images, none of which is known a priori, the undoing of the double exposure is extremely difficult or impossible. This is because the recorded image contains just one value per pixel, which is half as much information as in the original image pair.

SUMMARY

In one aspect, an exemplary embodiment of the present disclosure may provide a method for image processing comprising sensing a double-exposure image of a plurality of scene images having a shift in a shift direction. In one example, the double-exposure image is a result of a double-exposure operator. The method includes aligning the shift direction of the double-exposure image along an axis of a coordinate system, separating the shift in the axis of the coordinate system, expressing the double-exposure operator as a Toeplitz matrix, and recovering an estimated single-exposure image of the scene. In one example, the recovering the single-exposure image is accomplished via regularized pseudo-inversion. In another example, the recovering the single-exposure image is accomplished via singular value decomposition. The method further includes normalizing the estimated single-exposure image to provide a normalized estimated single-exposure image. In one example, the normalizing the estimated single-exposure image is accomplished by dividing, element by element, the estimated image by the transform of an all-white image of ones. The method further includes applying a modified Landweber iteration to the estimated single-exposure image to provide an improved estimated single-exposure image and applying an a posteriori criterion to the modified Landweber iteration based on a norm of residual error after n iterations. In one example, the method includes stopping the modified Landweber iteration when the norm begins to increase or when the n iterations exceeds a pre-set number. In one example, the plurality of scene images are specklegrams. The method further includes acquiring the plurality of scene images from at least one shifting viewpoint. Landweber iteration is only one example of a general class of methods of iterative improvement of numerical solutions, and other iterative improvement solutions can be used in its place.

In another aspect, an exemplary embodiment of the present disclosure may provide a method for image processing comprising sensing a double-exposure image of a strain-change field. In one example, the strain-change field has gains of opposite signs for shifted exposures and un-shifted exposures, the shifted exposures have a shift in a shift direction, and the double-exposure image is a result of a double-exposure operator. The method further includes aligning the shift direction of the double-exposure image along an axis of a coordinate system, separating the shift in the axis of the coordinate system, expressing the double-exposure operator as a Toeplitz matrix, and recovering an estimated strain image. In one example, the recovering the strain image is accomplished via regularized pseudo-inversion. In another example, the recovering the strain image is accomplished via singular value decomposition. The method further includes applying a modified Landweber iteration, or equivalent iteration method, to the estimated strain image to provide an improved estimated strain image and applying an a posteriori criterion to the modified Landweber iteration based on a norm of residual error after n iterations. In one example, the method further includes stopping the modified Landweber iteration when the norm begins to increase or when the n iterations exceeds a pre-set number. In one example, the double-exposure image of the strain-change field is a specklegram. The method further includes acquiring the double-exposure image of the strain-change field from at least one shifting viewpoint.

In another aspect, and exemplary embodiment of the present disclosure may provide Systems and methods for double-exposure image processing utilizing inversion techniques. The systems and methods of the present disclosure recover single-exposure images from double-exposure images and strain images from double-exposure images.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

In shearography, each lidar image is a combination of two optical fields, one shifted by a shear distance relative to the other. The shearing allows tiny differences (sub-micron) in surface motion to be mapped from a safe standoff distance. However, the raw intensity image resembles a double-exposure from an ordinary camera. Thus, a shearography system is paired with a conventional spotting camera to provide context to help the human operator understand the scene. The spotting camera adds size, weight and power (SWaP) and requires processing to co-register with the shearograms.

However, if the multiple exposures are of the same scene, but acquired from shifting viewpoints (as from a moving vehicle), image recovery is possible, with the new techniques presented herein—regularized separable-matrix inversion. Further, the algorithm is efficient and implementable with modest computational resources. In this work, the present application describes how undoing the double-exposure effect in a sheared specklegram can be accomplished. This extends the mathematics to remove multi-exposure effects in general, a process that applies to any kind of imaging system, not just shearography systems. Finally, the disclosure describes the mathematics and algorithm to show how a shearogram computed from multiple sheared specklegrams can be processed to yield the un-sheared strain-change field that gave rise to the phase features revealed by a shearogram.

Figure 1:
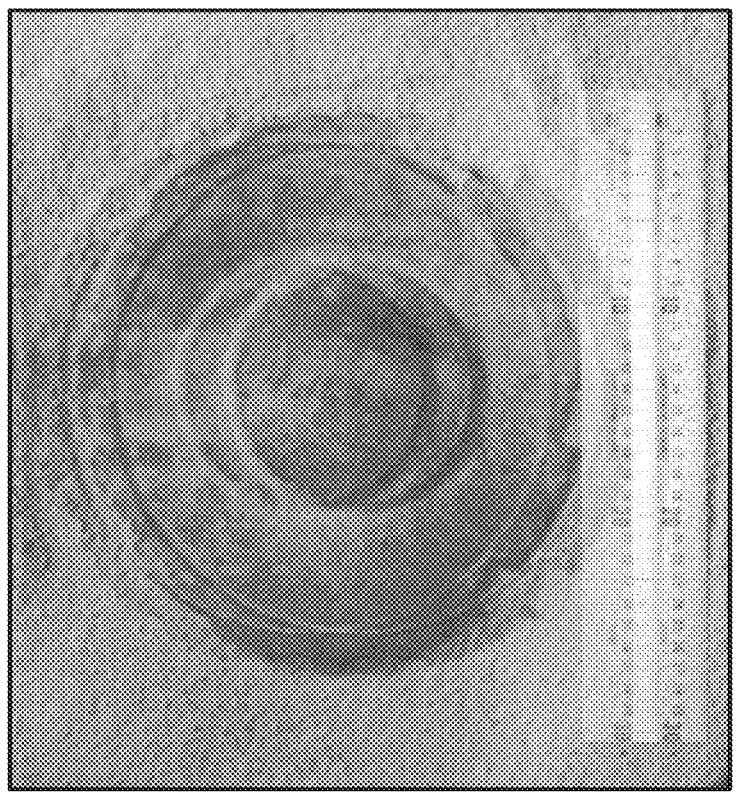
FIG. 1 is an exemplary image depicting a double exposure from digital shearography.

Consider an intensity image, such as the intensity image shown in FIG. 1, that shows two images that illustrate double exposure of a central image, which represents a surface elevation disturbance, and a ruler showing a horizontal shift from the double exposure, wherein the double-exposure is in the form:

$$S(r)=I(r)+g(r+\Delta s)*I(r+\Delta s) \qquad \text{Equation (1)}$$

where $S(r)$ is, $I(r)$ is, g is gain, r is, $\Delta s$ is a shift vector.

In discrete matrix-element notation:

$$S(i,j)=I(i,j)+g(i+s_r,j+s_c)*I(i+s_r,j+s_c) \qquad \text{Equation (2),}$$

where:
sr is the row shift, sc is the column shift, S is the raw sensed image with double exposure, with dimensions RS×CS, and I is the true input image to be calculated. The dimensions of I are (R+sr)×(C+sc), and the quantity g is gain ratio between images, which usually will be close to 1.

The general matrix expression for the forward relationship is:

$$S=M_{X,1}I\,M_{Y,1}^T+gM_{X,2}I\,M_{Y,2}^T \qquad \text{Equation (3).}$$

For the double-exposure inversions, it is computationally convenient to absorb the gs into the $M_X$s. However, this is not the exclusive option as constant gains $g_j$ could be absorbed into the $M_{Y,j}$s or partitioned into separate x and y components such that $g=g_X \times g_Y$.

A specific example: where $s_r=1$ and $s_c=1$, and R=C=2 is as follows:

$$\begin{bmatrix} S(1,1) & S(1,2) \\ S(2,1) & S(2,2) \end{bmatrix} = \begin{bmatrix} I(1,1) & I(1,2) \\ I(2,1) & I(2,2) \end{bmatrix} + \qquad \text{Equation (4)}$$

$$g\begin{bmatrix} I(2,2) & I(2,3) \\ I(3,2) & I(3,3) \end{bmatrix} = \begin{bmatrix} 1 & 0 & 0 \\ 0 & 1 & 0 \end{bmatrix}$$

$$\begin{bmatrix} I(1,1) & I(1,2) & I(1,3) \\ I(2,1) & I(2,2) & I(2,3) \\ I(3,1) & I(3,2) & I(3,3) \end{bmatrix} \begin{bmatrix} 1 & 0 \\ 0 & 1 \\ 0 & 0 \end{bmatrix} + g \begin{bmatrix} 0 & 1 & 0 \\ 0 & 0 & 1 \end{bmatrix}$$

$$\begin{bmatrix} I(1,1) & I(1,2) & I(1,3) \\ I(2,1) & I(2,2) & I(2,3) \\ I(3,1) & I(3,2) & I(3,3) \end{bmatrix} \begin{bmatrix} 0 & 0 \\ 1 & 0 \\ 0 & 1 \end{bmatrix}.$$

The computation of the true image I from the sensed image S is an example of an ill-posed inversion. In ill-posed problems, the number of unknowns to be estimated exceed the number of input data points. For multiple exposures, the size of the mismatch is determined by the maximum row shift $s_{r,Max}$ and the maximum column shift $s_{c,Max}$ in the set of shift vectors $\Delta s$. If the sensed image has $R_S$ rows and $C_S$ columns, the true image has $R_I$ rows and $C_I$ columns, where:

$$R_I=(R_S+S_{r,Max}) \qquad \text{Equation (5),}$$

and $$C_I=(C_S+S_{c,Max}) \qquad \text{Equation (7).}$$

Thus, the number of known values is $R_S \times C_S$, while the number of unknowns is greater, numbering $(R_S+S_{r,Max}) \times (C_S+S_{c,Max})$. Because of this mismatch, estimating the true image requires regularized inversion methods, even in the absence of noise sources. The practical effect for the multiple-exposure problem is that the image $I_{out}$ will include a border region of approximately $s_R$ rows and $s_C$ columns in which the image recovery is less accurate.

The solution of Equation (3). begins with rotating the image S into coordinates in which the shear direction is along an axis of the image. This converts the sum-separable into a fully separable equation of the form:

$$S = M_X I M_Y^T \qquad \text{Equation (7).}$$

In particular, coordinate rotation can align the shear direction with an axis of the new coordinate system, so that one of the M-matrices is an identity matrix. That is, one in which either $s_r$ or $s_c$ equals zero. For the sake of example, let $s_y=0$ in the rotated coordinates. In the coordinate system rotated by an angle $\theta$ such that:

$$\cos\theta = s_c/\sqrt{s_r^2+s_c^2} \qquad \text{Equation (8),}$$

A forward expression can be written as single a pair (i.e., left and right) of matrix multiplications as follows:

$$S = M_X I = (M_{X,1}+M_{X,2}) \qquad \text{Equation (9),}$$

with the shift on the transformed x-axis given by:

$$\Delta s = \begin{bmatrix} s_r \\ s_c \end{bmatrix} \text{ (old coordinates)} \to \qquad \text{Equation (10)}$$

$$\Delta s = \begin{bmatrix} \sqrt{s_r^2+s_c^2} \\ 0 \end{bmatrix} \text{ (new coordinates).}$$

Equation (9). is solved for I by using regularized pseudo-inversion (SVD will also work), to create an estimated image $I_{Est}$. We choose the regularization constant $\lambda$ based on noise, as well as on the degree of ill-posedness imposed by the shift $\Delta s$.

The shifts and gain ratios are assumed to be known in advance. The pseudo-inverse estimate $I_{Est}$ of the true input image is given by:

$$I_{Est} = Q_L S \qquad \text{Equation (11)}$$

where, $$Q_L = [(M_{X,1}+M_{X,2})^T(M_{X,1}+M_{X,2}) - \lambda 1_L]^{-1}(M_{X,1}+M_{X,2})^T \qquad \text{Equation (12).}$$

In Equation (12), $1_L$ denotes a square identity matrix with dimensions $R_I$. The dimensions of $Q_L$ are $C_I \times C_S$. The inversion is normalized by dividing, element-by-element, the result of computing Equation (11) by the transform of an all-white image of ones:

$$I_W = Q_L W_S \qquad \text{Equation (13),}$$

where $W_S$ is a matrix with the same dimensions as S, but with all elements set equal to one.

The output estimate $I_{Out}$ is then the ratio:

$$I_{Out} = I_{Esr}/I_W \qquad \text{Equation (14)}$$

The notation "./" indicates an element-by-element Hadamard division of the matrix elements. If the shifts and gain ratios are constant, computation of $Q_L$ needs to be done only once for the entire data series. Thus, the only frame-by-frame operations required are pairs of matrix multiplications (no more inversions), so the computations are very quick.

Although Equation (9) has been described as being solved for I by using regularized pseudo-inversion, Equation (9) may also be solved or I using other techniques, such as, for example, singular value decomposition (SVD), with techniques and methods described in in U.S. Pat. No. 9,445,115 to DeWeert et al., which is incorporated by reference as if fully rewritten herein.

The results of computations described above may be further modified via modified Landweber iteration, which is a process or technique utilized to solve ill-posed linear inverse problems and non-linear problems that involve constraints. More particularly, the solutions derived from Equation (14) are modified using a Landweber constant $\lambda_L$ to control the convergence rate. It should be noted that the Landweber constant $\lambda_L$ is independent of the inversion-regularization constant $\lambda$. After n iterations, the next iteration yields:

$$I_{(n+1)} = I_{(n)} + \lambda_L\{Q_L[S^\delta-(M_{X,1}+M_{X,2})I_{(n)}]\}./I_W+a_n(I_{(n)}-I_{(0)}) \qquad \text{Equation (15),}$$

with: $a_n = 1/(4+n) \qquad \text{Equation (16),}$ and $I_{(0)} = I_{Out}$ from Equation (14). So as long as $0 < \lambda_L < 2$, Equation (15) will converge. However, some noise artifacts may be reintroduced as the iterations attempt to minimize the residuals:

$$R_{(n)} = [S^\delta-(M_{X,1}+M_{X,2})I_{(n)}] \qquad \text{Equation (17),}$$

since $S^\delta$ includes noise contributions that may not be common to all of the images composing the multiple exposure. To minimize the errors, an a posteriori criterion is applied, based on the norm of the residual error after n iterations:

$$\|r_{(n)}\|^2 = \sum_{i,j}(R_{(n)}(i,j))^2. \qquad \text{Equation (18)}$$

Figure 2A:
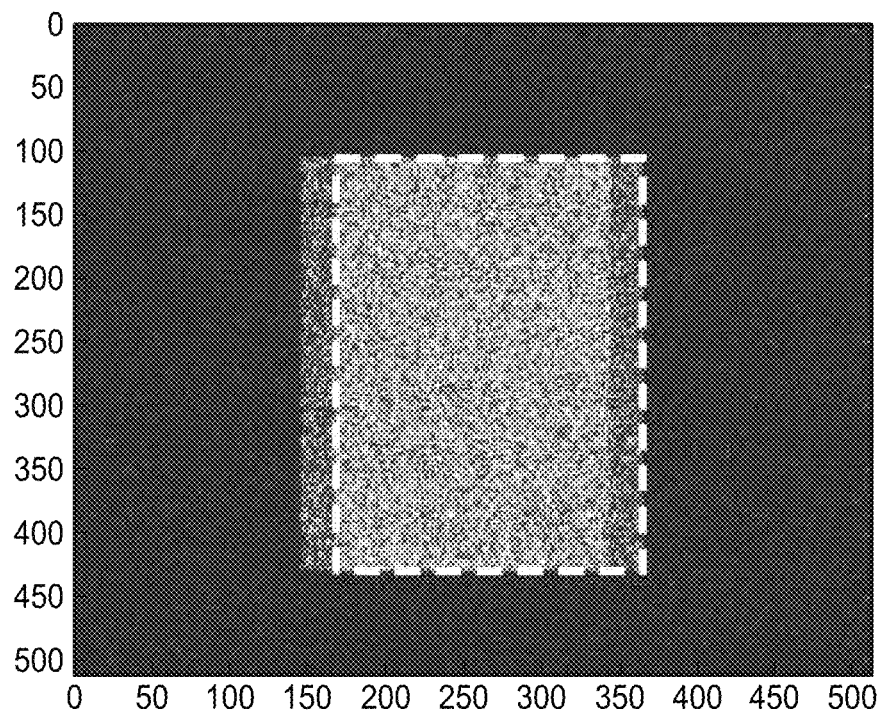
FIG. 2A is a raw specklegram showing a double-exposure type image aligned with the shear direction along the image x-axis.
Figure 2B:
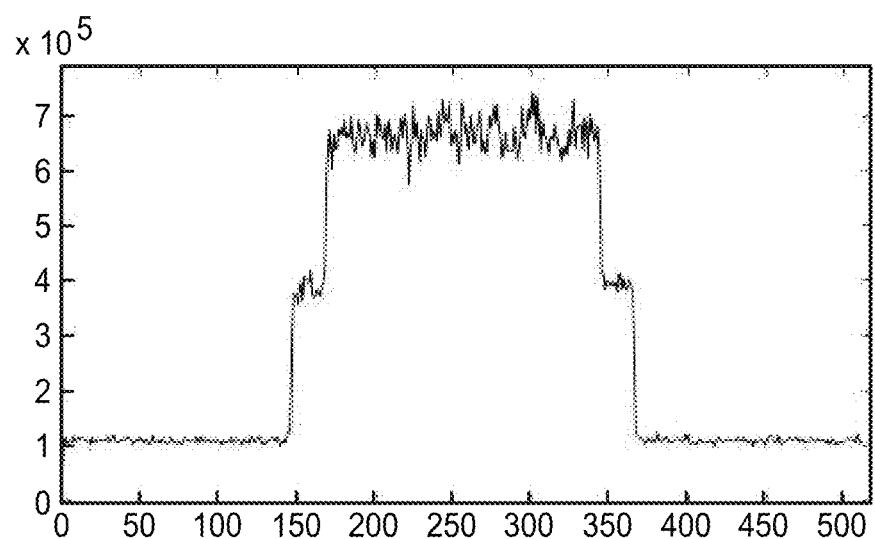
FIG. 2B is a graph depicting an average of all the rows across the raw image, quantifying the image and noise.
Figure 2C:
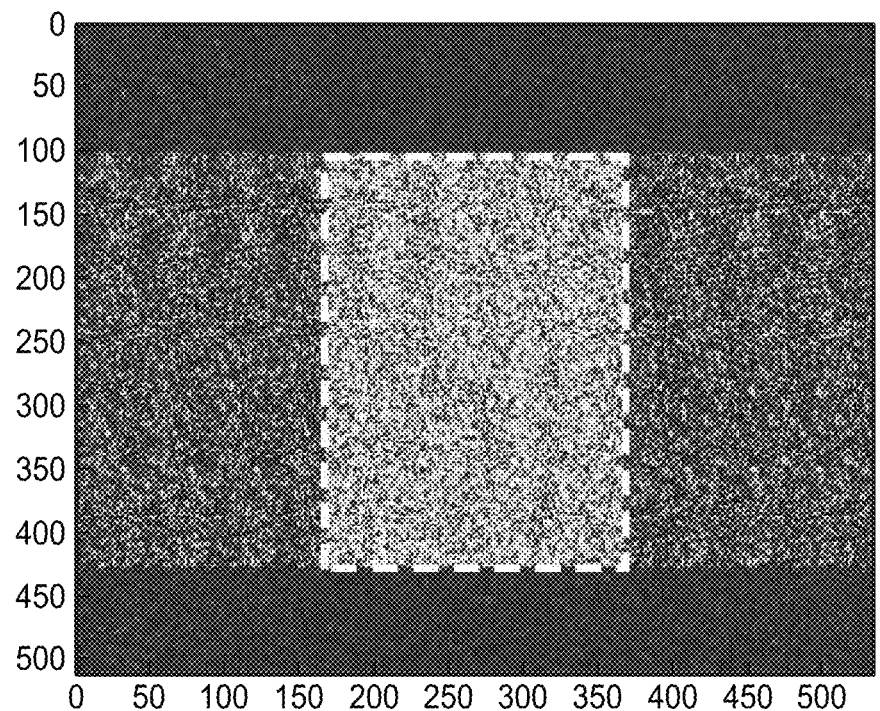
FIG. 2C is an exemplary estimated image.
Figure 2D:
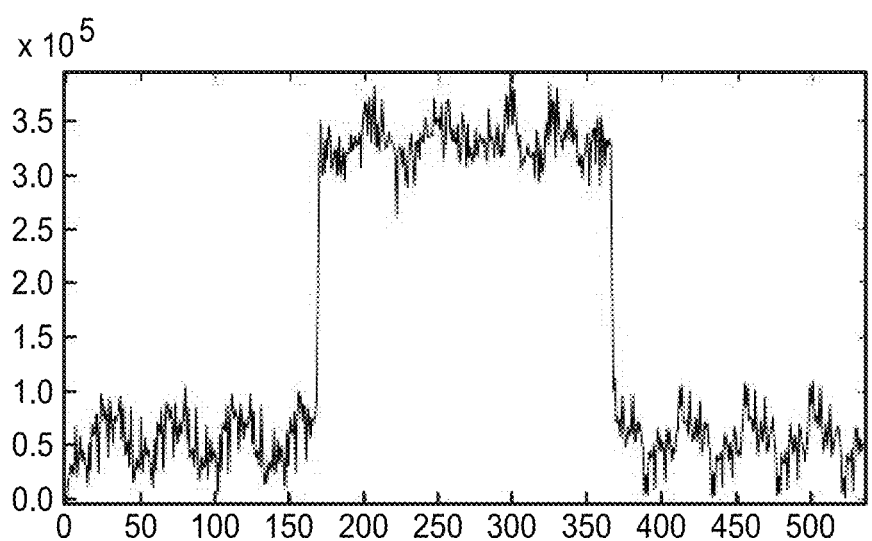
FIG. 2D is a graph depicting the averaged row.
Figure 2E:
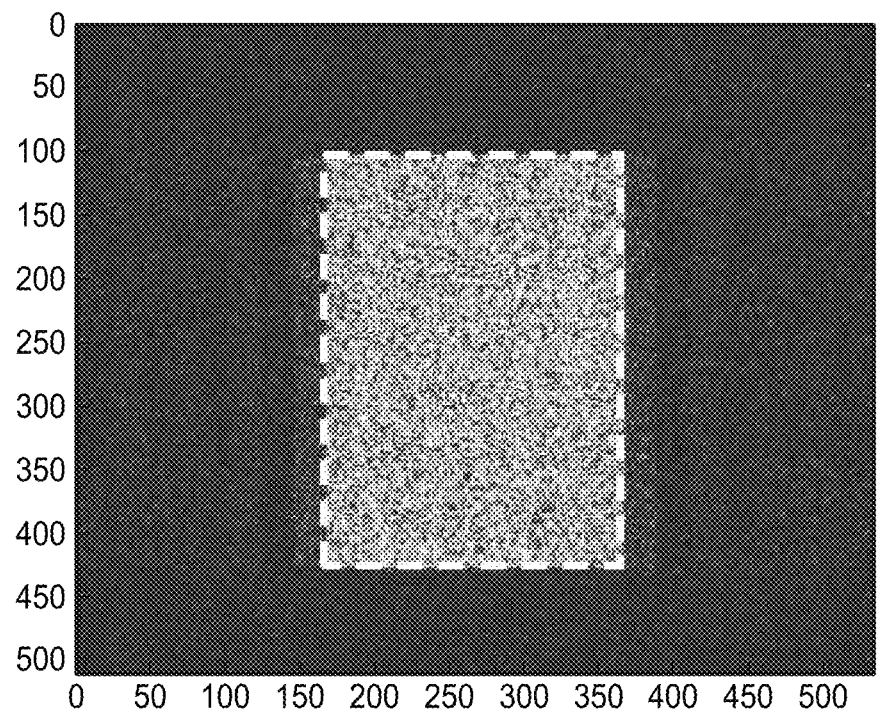
FIG. 2E is an image showing the improvement to the image after Landweber iteration.
Figure 2F:
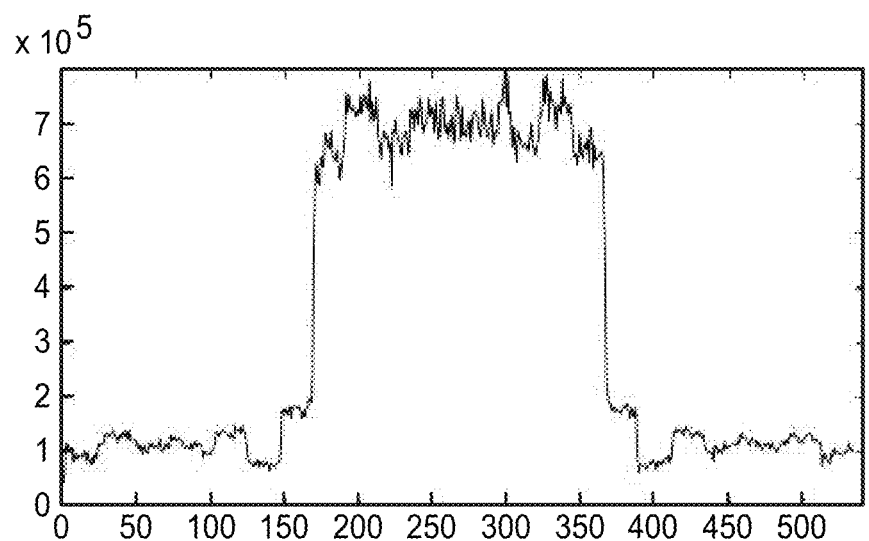
FIG. 2F is a graph depicting the averaged row, quantifying the improved contrast and reduced noise.

The iterations stop when the norm in Equation (18) begins to increase, or when the number of iterations exceeds a pre-set maximum number. FIG. 2A through FIG. 2F depicts an example of a raw noisy specklegram S showing the double-exposure effect, an $I_{Est}$ computed from Equation (14), and the improved output $I_{(n)}$ with Landweber iteration. FIG. 2A is a raw specklegram showing a double-exposure type image aligned with the shear direction along the image x-axis. The white dashed-line rectangle shows the size of the true high-reflectance area. FIG. 2B is a graph depicting an average of all the rows across the raw image, quantifying the image and noise. FIG. 2C is an image of $I_{Est}$ computed from Equation (14). FIG. 2D is a graph depicting the averaged row. As shown in FIG. 2C, the double exposure has been consolidated into one noisy single exposure type image. FIG. 2E is an image showing the improvement to the image after Landweber iteration, Equation (15). FIG. 2F is a graph depicting the averaged row, quantifying the improved contrast and reduced noise.

In shearography, the exposures in Equation (3) are simultaneous, and produced by image-splitting and image-shifting optics that combine the exposures into a specklegram. Processing a series of specklegrams into a shearogram reveals subtle changes in the surface being imaged. The main interest of our shearography work is in identifying hidden structures and defects, for which a shearogram or a sequence of shearograms is sufficient. However, there may also be applications for which the absolute phase change at each point is desired, in addition to phase differences across a shear field. With the processing outlined here, one shearogram provides the relevant data for such determining the phase change at each point in a reconstructed image.

A shearogram gives the change in some load-response signal between an initial condition at time $t_i$ and a final condition at time $t_f$. The shearogram is an image of the signal differences: Shearogram$(t_i,t_f)\approx$Signal $(t_f)$–Signal $(t_i)$. If h denotes an image of the underlying phase-sensitive quantity, then the sheared signal is:

$$\text{Signal}(r,t_i) \approx h(r+\Delta r_{Shear}, t_i) - h(r,t_i) \quad \text{Equation (19),}$$

at the initial time, and $$\text{Signal}(r,t_f) \approx h(r+\Delta r_{Shear}, t_f) - h(r,t_f) \quad \text{Equation (20)}$$

at the final time. If the shearing field $\Delta r_{shear}$ is a simple linear displacement of the entire image, so that $\Delta r_{shear}=(\Delta x\ \Delta y)$, then the shear is separable in the row and column directions, so that the signal images are given by:

$$\text{Signal}(t_{i(f)}) = [g_0 M_{X,0} + g_1 M_{X,1}] h(t_{i(f)}), \text{with } g_0 = -1, \text{ and}$$
$$g_1 = +1 \quad \text{Equation (21).}$$

In Equation (11), $M_{X,0}$ is a Toeplitz matrix with dimensions $R_S \times R_I$, and is composed of all zeros, except for ones along the diagonal of the first $R_S$ columns. The shift matrix $M_{X,1}$ has the same structure, except with the ones shifted by $\Delta x$ columns. Therefore, the shearogram can be defined as follows:

$$\text{Shearogram}(t_i,t_f)\approx[h(r+\Delta r_{Shear},t_f)-h(r,t_f)]-[h(r+\Delta r_{Shear},t_i)-h(r,t_i)]=[h(r+\Delta r_{Shear},t_f)-h(r+\Delta r_{Shear},t_i)]-[h(r,t_f)-h(r,t_i)] \quad \text{Equation (22)}$$

The temporal strain-change field is defined as:

$$\varepsilon_{Strain}(t_i,t_f) \equiv [h(t_f) - h(t_i)] \quad \text{Equation (23).}$$

Thus, each shearogram can be expressed in terms of the change in strain between the initial and final time as follows:

$$\text{Shearogram}(t_i,t_f) \approx [g_0 M_{X,0} + g_1 M_{X,1}] \varepsilon(t_i,t_f) \quad \text{Equation (24),}$$

with $$g_0 = -1 \text{ and } g_1 = 1 \quad \text{Equation (25).}$$

Solving Equation (24) yields the temporal strain field $\varepsilon_{Strain}(t_i,t_f)$, to within a global constant. If there are points (such as clamped edges) at which the absolute strain is known, the global constant can be determined, and the absolute strain computed for the entire image. In analogy with Equation (11), the estimated strain field is then given by:

$$\varepsilon_{Out}(t_i,t_f) = Q_L \text{Shearogram}(t_i,t_f) \quad \text{Equation (26),}$$

where $$Q_L = [(g_0 M_{X,1} + g_1 M_{X,2})^T (g_0 M_{X,1} + g_1 M_{X,2}) + \lambda 1_L]^{-1} (g_0 M_{X,1} + g_1 M_{X,2})^T \quad \text{Equation (27).}$$

Because the zero-signal strain field in Equation (23) would be all zeros, a normalization step like Equation (14) is unnecessary, and would introduce divide-by-zero artifacts. Equation (26) gives the strain-field change between times $t_i$ and $t_f$, computed from a single shearogram. The strain field estimate can also be improved via Landweber iteration or other iterative methods, but with the normalization factor omitted as follows:

$$\varepsilon_{(n+1)} = \varepsilon_{(n)} + \lambda_L \{Q_L[S^\delta - (M_{X,1} + M_{X,2})\varepsilon_{(n)}]\} + a_n(\varepsilon_{(n)} - \varepsilon_{(0)}) \quad \text{Equation (28).}$$

Figure 3A:
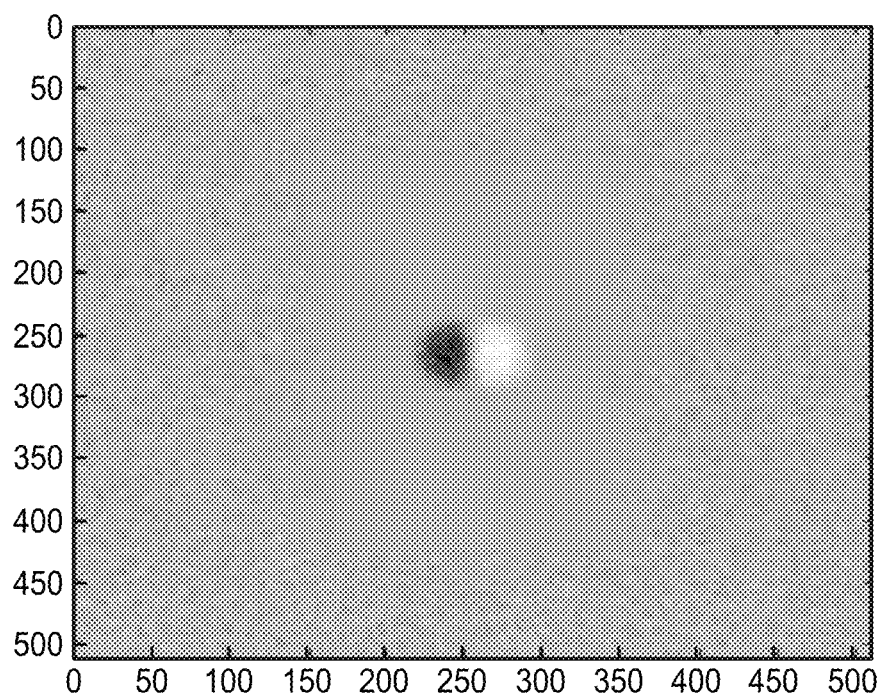
FIG. 3A is a phase-resolved shearogram computed from four sequential specklegrams, showing a "butterfly" pattern along the shear direction.
Figure 3B:
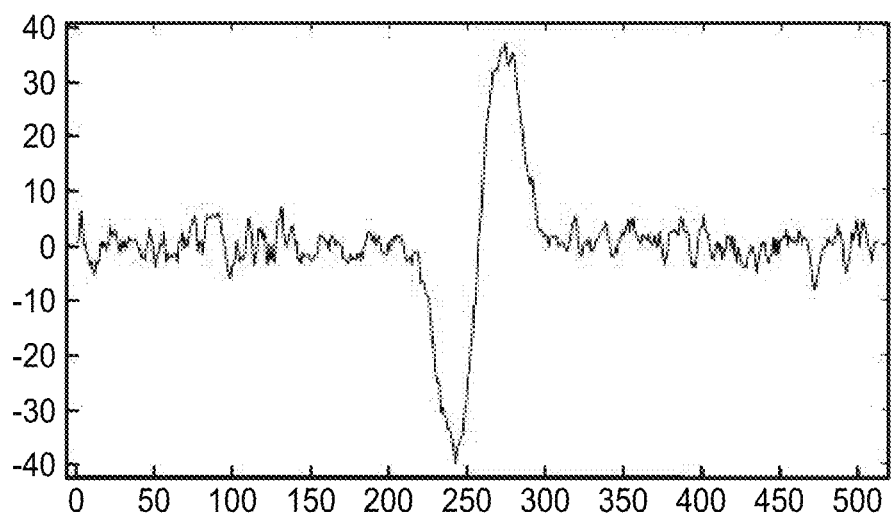
FIG. 3B is a graph depicting an average of all the rows across the raw image, quantifying the phase-shift and noise.
Figure 3C:
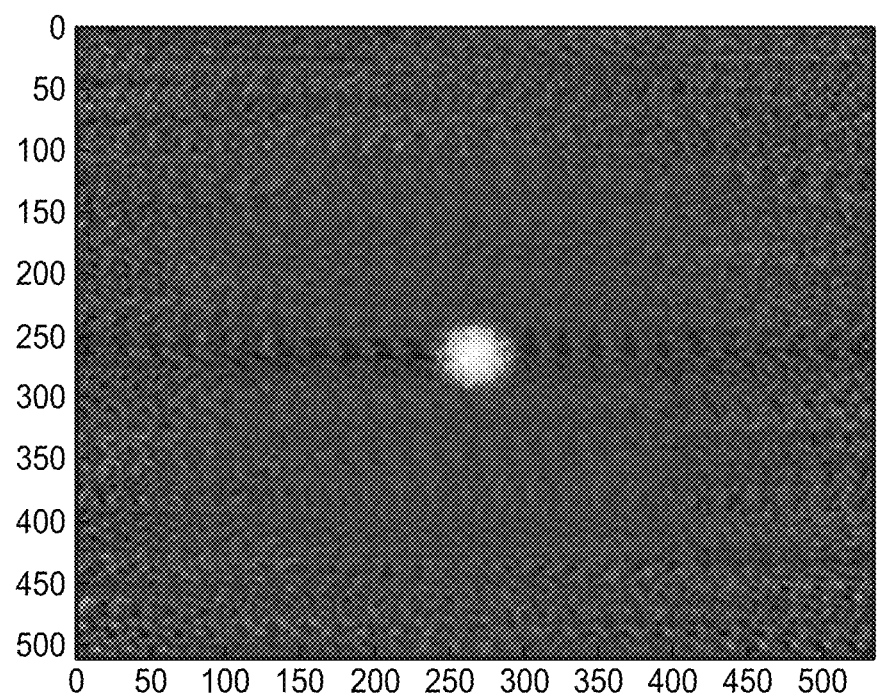
FIG. 3C is an exemplary estimated image.
Figure 3D:
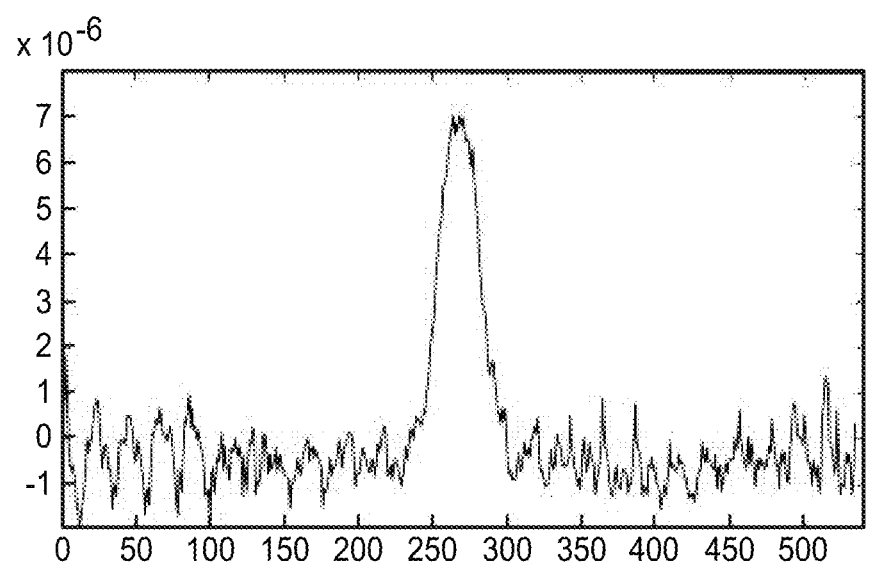
FIG. 3D is a graph depicting the averaged row.
Figure 3E:
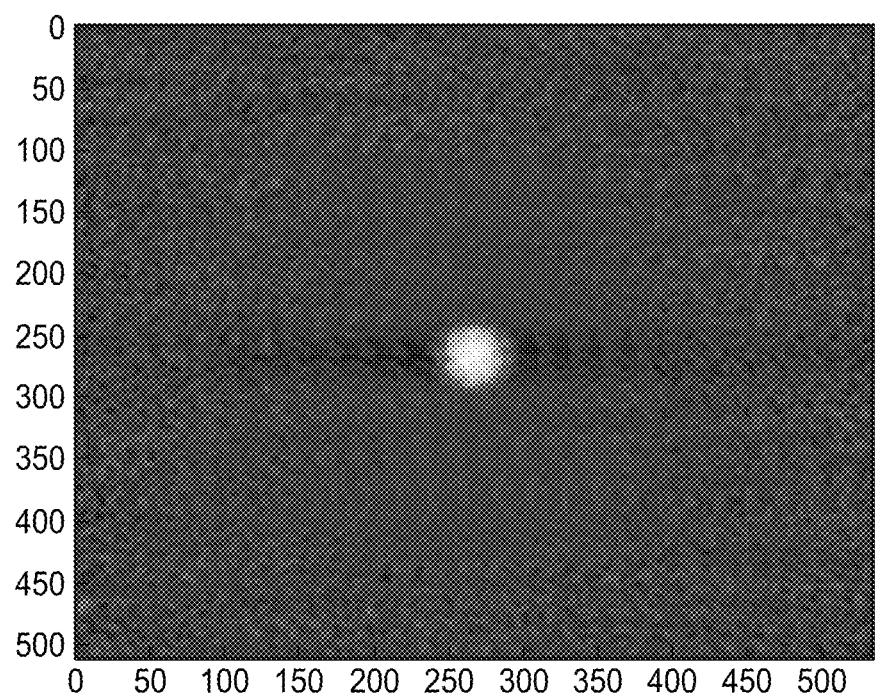
FIG. 3E is an image showing the improvement to the image after Landweber iteration.
Figure 3F:
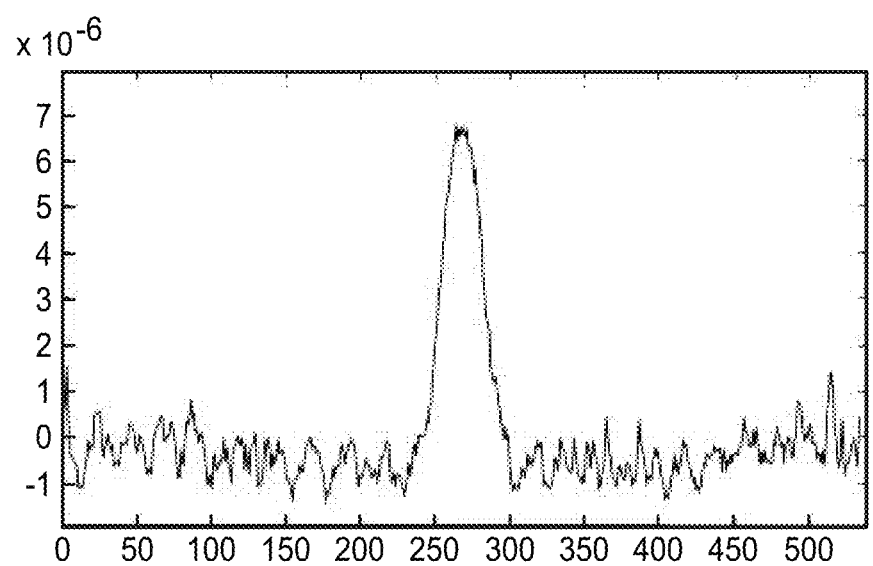
FIG. 3F is a graph depicting the averaged row, quantifying the improved contrast and reduced noise.

FIG. 3A through FIG. 3F depict exemplary processing for recovering the strain field from a shearogram, for a case in which a shearography target is embedded in a high-reflectance rectangular patch on a low-reflectance background similar to FIG. 2A through FIG. 2F. FIG. 3A is a phase-resolved shearogram computed from four sequential specklegrams, showing a "butterfly" pattern along the shear direction. Because the deformation between the first and last image was just ½ of a wavelength of light, each "wing" of the butterfly pattern has a single fringe. The phase-resolved shearogram computed in FIG. 3A can be computed utilizing the techniques described in U.S. Pat. No. 9,476,700 to DeWeert et al., which is incorporated by reference as if fully rewritten herein. FIG. 3B is a graph depicting an average of all the rows across the raw image, quantifying the phase-shift and noise. FIG. 3C is an image of $\varepsilon_{Out}$ computed from Equation (26). FIG. 3D is a graph depicting the averaged row. As shown in FIG. 3C, the butterfly pattern has been consolidated into one strain image, showing the "breathing mode" deformation that gave rise to the butterfly shearogram. FIG. 3E is an image showing the improvement to the image after Landweber iteration, Equation (15). FIG. 3F is a graph depicting the averaged row, quantifying the improved contrast and reduced noise.

Figure 4:
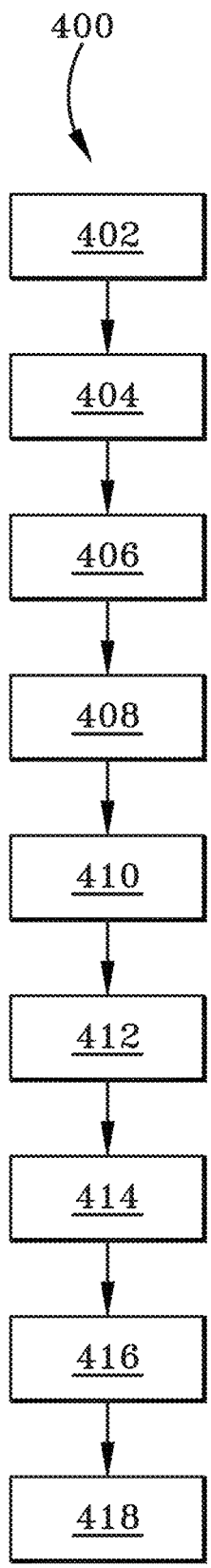
FIG. 4 depicts a flowchart of a method for image processing where a single-exposure image is recovered from a double-exposure image.

FIG. 4 depicts a flowchart of a method for image processing according to one embodiment generally at 400. Method 400 includes sensing a double-exposure image of a plurality of scene images having a shift in a shift direction, which is shown generally at 402. In one example, the scene images are scene image copies and the double-exposure image is a result of a double-exposure operator. The method 400 includes aligning the shift direction of the double-exposure image along an axis of a coordinate system, which is shown generally at 404. The method 400 includes separating the shift in the axis of the coordinate system, which is shown generally at 406. The method 400 includes expressing the double-exposure operator as a Toeplitz matrix, which is shown generally at 408. The method further includes recovering an estimated single-exposure image of the scene, which is shown generally at 410. In one example, the recovering the single-exposure image is accomplished via regularized pseudo-inversion. In another example, the recovering the single-exposure image is accomplished via singular value decomposition.

The method 400 further includes normalizing the estimated single-exposure image to provide a normalized estimated single-exposure image, which is shown generally at 412. In one example, the normalizing the estimated single-exposure image is accomplished by dividing, element by element, the estimated image by the transform of an all-white image of ones. The method 400 further includes applying a modified Landweber iteration to the estimated single-exposure image to provide an improved estimated single-exposure image, which is shown generally at 414. The method 400 further includes applying an a posteriori criterion to the modified Landweber iteration based on a norm of residual error after n iterations, which is shown generally at 416. In one example, the method 400 includes stopping the modified Landweber iteration when the norm begins to increase or when the n iterations exceeds a pre-set number, which is shown generally at 418. In one example, the plurality of scene images are specklegrams. The method 400 further includes acquiring the plurality of scene images from at least one shifting viewpoint, which is shown generally at 418.

Figure 5:
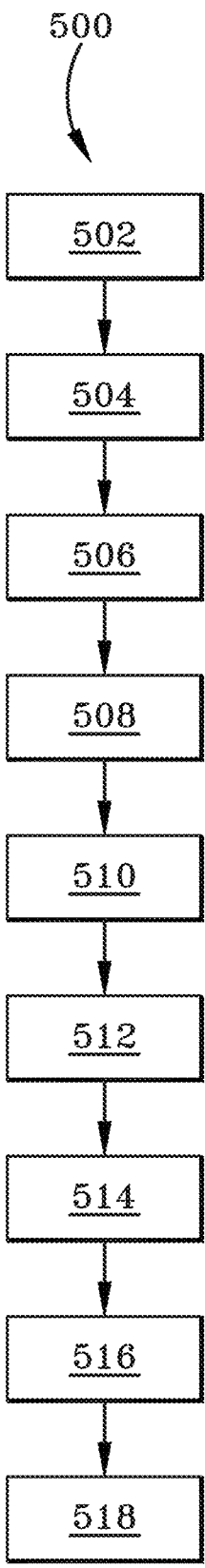
FIG. 5 depicts a flowchart of a method for image processing where a strain image is recovered from a double-exposure image.

FIG. 5 depicts a flowchart of a method for image processing generally at 500 according to one embodiment. Method 500 includes sensing a double-exposure image of a strain-change field, which is shown generally at 502. In one example, the strain-change field has gains of opposite signs for shifted exposures and un-shifted exposures, the shifted exposures have a shift in a shift direction, and the double-exposure image is a result of a double-exposure operator. The method 500 further includes aligning the shift direction of the double-exposure image along an axis of a coordinate system, which is shown generally at 504. The method includes separating the shift in the axis of the coordinate system, which is shown generally at 506. The method 500 further includes expressing the double-exposure operator as a Toeplitz matrix, which is shown generally at 508. The method 500 further includes recovering an estimated strain image, which is shown generally at 510. In one example, the recovering the strain image is accomplished via regularized pseudo-inversion. In another example, the recovering the strain image is accomplished via singular value decomposition. The method 500 further includes applying a modified Landweber iteration to the estimated strain image to provide an improved estimated strain image, which is shown generally at 512. The method further includes applying an a posteriori criterion to the modified Landweber iteration based on a norm of residual error after n iterations, which is shown generally at 514. In one example, the method 500 further includes stopping the modified Landweber iteration when the norm begins to increase or when the n iterations exceeds a pre-set number, which is shown generally at 516. In one example, the double-exposure image of the strain-change field is a specklegram. The method 500 further includes acquiring the double-exposure image of the strain-change field from at least one shifting viewpoint, which is shown generally at 518.

Figure 6:
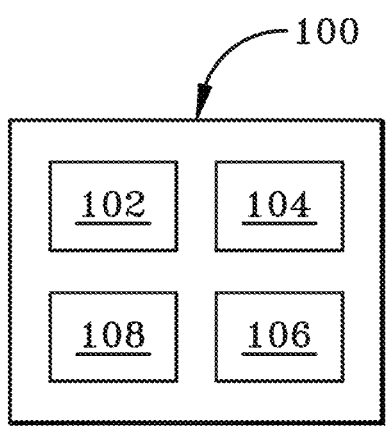
FIG. 6 is an exemplary imaging system in accordance with the present disclosure.

It is to be understood that the above-described methods 400 and 500 may be implemented via any suitable imaging system, such as, for example, a simulator system depicted in FIG. 6 and denoted as 100. The imaging system 100 includes a sensor 102, at least one non-transitory computer readable storage medium 104 having instructions encoded thereon that, when executed by at least one processor 106, implements various logics 108 for implementing the above-described methods 400 and 500. More particularly, the at least one non-transitory computer readable storage medium 104 having instructions encoded thereon that, when executed by at least one processor 106, implements the various logics 108 to recover a single-exposure image from a double-exposure image and recover a strain image from a double-exposure image.

As noted above, conventional shearography imagers for remote sensing typically generate double-exposure images. As such, shearographic imagers for remote sensing are commonly paired with conventional spotting imagers that provide single-exposure images, adding context for the shearographic analyst. One drawback associated with utilizing conventional spotting imagers is the additional size, weight, power and cost of the additional spotting imagers within the shearographic imaging system. Another drawback associated with utilizing conventional spotting imagers is additional processing required to co-register the spotting functions with the shearography systems. The systems and methods of the present disclosure obviate the need for the conventional spotting camera which, among other things, reduces size, weight, power and cost of the imaging system.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for image processing, comprising:
sensing a double-exposure image of a plurality of scene images having a shift in a shift direction; wherein the double-exposure image is a result of a double-exposure operator;
aligning the shift direction of the double-exposure image along an axis of a coordinate system;
separating the shift in the axis of the coordinate system;
expressing the double-exposure operator as a Toeplitz matrix; and
recovering an estimated single-exposure image of the scene.

2. The method of claim 1, wherein the recovering the single-exposure image is accomplished via regularized pseudo-inversion.

3. The method of claim 1, wherein the recovering the single-exposure image is accomplished via singular value decomposition.

4. The method of claim 1, further comprising:
normalizing the estimated single-exposure image to provide a normalized estimated single-exposure image.

5. The method of claim 4, wherein the normalizing the estimated single-exposure image is accomplished by dividing, element by element, the estimated image by the transform of an all-white image of ones.

6. The method of claim 1, further comprising:
applying an iteration method to the estimated single-exposure image to provide an improved estimated single-exposure image.

7. The method of claim 6, further comprising:
applying an a posteriori criterion to the iteration method based on a norm of residual error after n iterations.

8. The method of claim 7, further comprising:
stopping the modified Landweber iteration when the norm begins to increase.

9. The method of claim 7, further comprising:
stopping the modified Landweber iteration when the n iterations exceeds a pre-set number.

10. The method of claim 1, wherein the plurality of scene images are specklegrams.

11. The method of claim 1, further comprising:
acquiring the plurality of scene images from at least one shifting viewpoint.

12. A method for shearographic processing, comprising:
sensing a double-exposure image of a strain-change field; wherein the strain-change field has gains of opposite signs for shifted exposures and un-shifted exposures; wherein the shifted exposures have a shift in a shift direction; wherein the double-exposure image is a result of a double-exposure operator;
aligning the shift direction of the double-exposure image along an axis of a coordinate system;
separating the shift in the axis of the coordinate system;
expressing the double-exposure operator as a Toeplitz matrix; and
recovering an estimated strain image.

13. The method of claim 12, wherein the recovering the strain image is accomplished via regularized pseudo-inversion.

14. The method of claim 12, wherein the recovering the strain image is accomplished via singular value decomposition.

15. The method of claim 12, further comprising:
applying an iteration method to the estimated strain image to provide an improved estimated strain image.

16. The method of claim 15, further comprising:
applying an a posteriori criterion to the modified Landweber iteration based on a norm of residual error after n iterations.

17. The method of claim 16, further comprising:
stopping the iteration method when the norm begins to increase.

18. The method of claim 16, further comprising:
stopping the modified Landweber iteration when the n iterations exceeds a pre-set number.

19. The method of claim 12, wherein the double-exposure image of the strain-change field is a specklegram.

20. The method of claim 1, further comprising:
acquiring the double-exposure image of the strain-change field from at least one shifting viewpoint.

* * * * *